Patented June 2, 1925.

1,539,996

UNITED STATES PATENT OFFICE.

PEDER FARUP, OF VESTRE AKER, NORWAY, ASSIGNOR TO TITAN CO. A/S., OF FREDRIKSSTAD, NORWAY.

PROCESS OF RECOVERING TITANIC OXIDE FROM TITANIUM-NITROGEN COMPOUNDS.

No Drawing.   Application filed December 20, 1922. Serial No. 608,094.

*To all whom it may concern:*

Be it known that I, PEDER FARUP, a subject of the King of Norway, and a resident of Vettakollen, Vestre Aker, Kingdom of Norway, have invented certain new and useful Improvements in Processes of Recovering Titanic Oxide From Titanium-Nitrogen Compounds, of which the following is a specification.

The present invention relates to recovering titanic oxide from titanium-nitrogen-compounds, and the object of the invention is a process whereby in a simple and practical manner the nitrogen contents as well as the titanium contents of these compounds may be utilized.

If titanium-nitrogen compounds are treated with concentrated sulphuric acid, it is possible to transform the nitrogen to ammonium sulphate and the titanium to titanium sulphate such for instance as described in my prior Norwegian Patent No. 29,839. I have, however, found that a considerably more advantageous process is attained if I employ a pressure higher than the atmospheric pressure, as then correspondingly higher temperatures may be employed and comparatively dilute sulphuric acid may be used.

Further the titanium sulphate which may be formed during the reaction will immediately decompose with practically complete precipitation of titanic acid. The sulphuric acid is again liberated and again takes part in the reaction. Thus only a negligible amount of sulphuric acid is required over that necessary to combine with the nitrogen present and with possible impurities. As a result of the process a solution is obtained containing principally ammonium sulphate and impurities, such as for instance iron, and a precipitate principally consisting of titanic acid.

The details of my process may of course be varied within wide limits. Thus I may employ different acid concentrations, temperature and pressure varying accordingly.

As a practical example of carrying out my process the following is given:

I take 1 part by weight of titanium nitride consisting of about 54% Ti, 10% $N_2$ and 5% Fe and impurities, prepared by reduction of ilmenite in an electric furnace in the presence of nitrogen and then freed of the principal part of the iron of the ilmenite and to some extent of silicates by treatment with dilute acid. This is mixed with 1,33 parts by weight of 50% sulphuric acid. I fill the mixture into an autoclave lined with acid proof material and heat for 3 hours at a pressure of 25 atmospheres.

I then remove the contents of the autoclave and separate the precipitate from the liquid by filtration and washing with water. The precipitate contains practically all the titanium of the nitride and consists of 85% $TiO_2$, 2% $N_2$, 0,5% Fe and 5% $H_2SO_4$.

The solution contains the rest of the nitrogen from the nitride in the form of ammonium sulphate and further impurities as sulphates of iron, silicates and some free sulphuric acid.

While the solution obtained may advantageously be treated for the recovery of ammonium sulphate, the resulting residue rich in titanium will be well suited for the manufacture of titanium pigments or titanium compounds in general, and may be further treated according to known methods.

If necessary I may subject the above mentioned residue rich in titanium to a renewed treatment with dilute sulphuric acid in an autoclave, whereby practically all nitrogen is transformed to ammonium sulphate. By this procedure I may advantageously employ the counter-current principle in that for the last autoclave treatment I employ a dilute sulphuric acid, and for the first autoclave treatment the thus obtained solution containing iron and ammonium sulphate.

What I claim as new and desire to secure by Letters Patent of the United States is:

The process of recovering titanic oxide from titanium nitrogen compounds which comprises mixing the compound with a quantity of sulphuric acid not materially exceeding that required to combine with the constituents of the compound other than titanium and heating the mixture in excess of atmospheric pressure whereby the titanium content of the material is obtained as an insoluble precipitate while its impurities as well as its iron and nitrogen contents are obtained as water soluble sulphates.

Signed at Kristiania, Norway, this 2nd day of December 1922.

PEDER FARUP.